Nov. 19, 1935.    N. RASKHODOFF    2,021,380
POWER SUPPLY SYSTEM FOR RADIO APPARATUS
Filed May 9, 1934    2 Sheets-Sheet 1

INVENTOR
Nicholas Raskhodoff
BY
ATTORNEY

Nov. 19, 1935.   N. RASKHODOFF   2,021,380
POWER SUPPLY SYSTEM FOR RADIO APPARATUS
Filed May 9, 1934   2 Sheets-Sheet 2
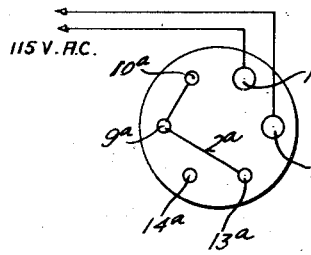
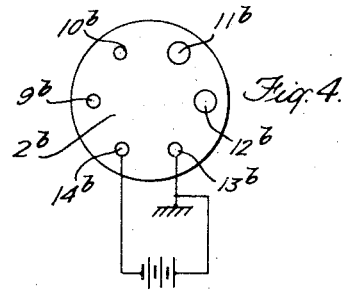
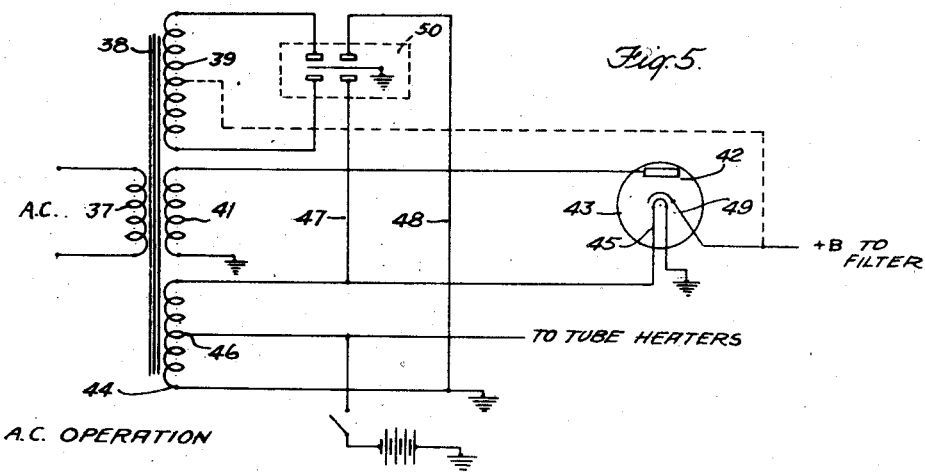
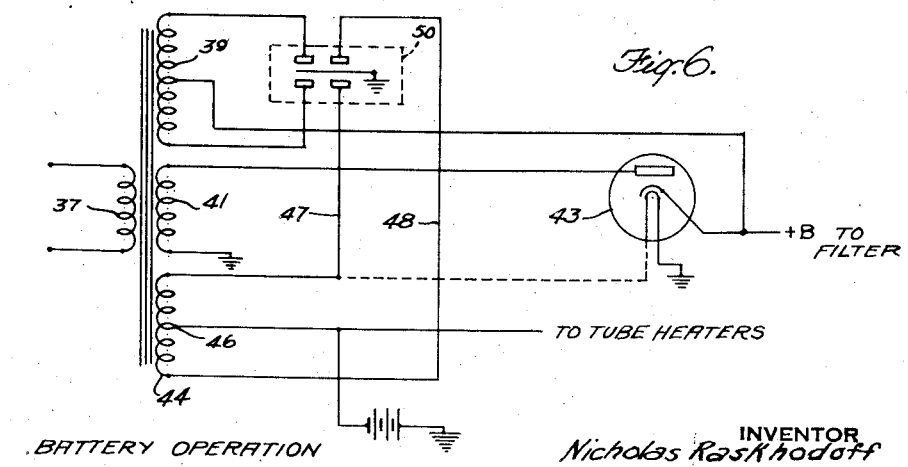
INVENTOR
Nicholas Raskhodoff
BY
ATTORNEY Patented Nov. 19, 1935

2,021,380

UNITED STATES PATENT OFFICE 2,021,380

POWER SUPPLY SYSTEM FOR RADIO APPARATUS

Nicholas Raskhodoff, Springfield, Mass., assignor to United American Bosch Corporation, Springfield, Mass., a corporation of New York Application May 9, 1934, Serial No. 724,707

5 Claims. (Cl. 171—97)

This invention relates to power supply systems for radio and similar purposes and more particularly to a power supply system which is arranged for dual input voltages and which will function properly when energized from sources having voltage characteristics of wide variation. More specifically, this invention provides a power supply which will deliver proper operating currents and potentials for radio use when the input is from either a battery or an A. C. power line.

Heretofore, in like systems it has been necessary to employ different transformers for each power source, increasing the size, weight and cost of such a device. In the system here shown, a single transformer is designed and proportioned to be utilized with both energizing sources, and sockets may be provided on the transformer shield casing where the vibrator and rectifier elements may be positioned. In this manner a compact, highly efficient and economical construction is achieved.

An object of this invention is to provide a power supply system which is operative under either A. C. or D. C. input.

Another object is to provide a power supply system having one power transformer and which may be operated from either an A. C. power line or a battery.

Still a further object is to provide a compact structure which avoids the necessity for long leads with attendant shielding difficulties.

Figure 1:
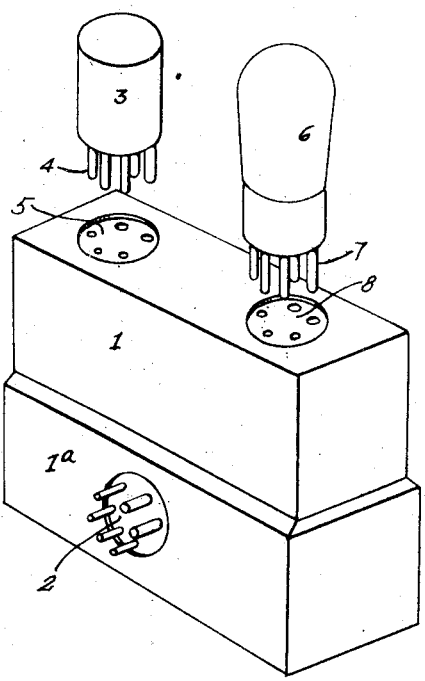
Figure 2:
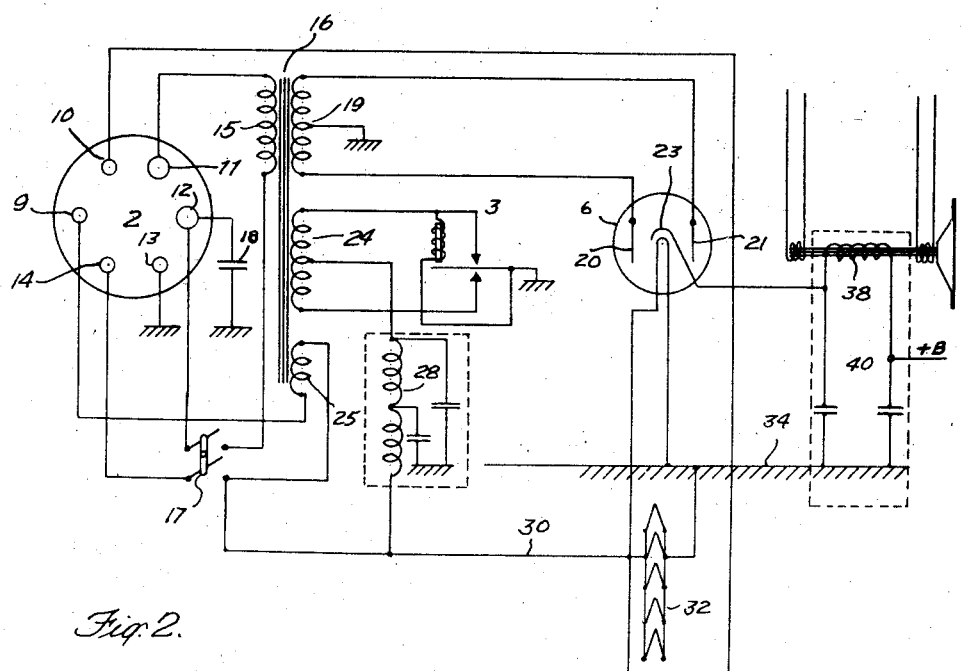

Other objects will in part be obvious and in part be pointed out in the following description and appended claims, reference being had to the accompanying drawings, in which:

Fig. 1 is a perspective view showing the transformer casing and the method of attaching the vibrator and rectifier units thereto; Fig. 2 is a diagrammatic view of the dual input power supply device; Fig. 3 is a wiring diagram of a connector socket to be used with A. C. input; Fig. 4 is a wiring diagram of a socket connector to be used with a battery input; and Figs. 5 and 6 are circuit diagrams of a modification of the circuit shown in Fig. 2.

The preferred embodiment of this invention is here set forth as a dual input power supply device for a portable radio which may be used in the home or in an automobile, but it is not the intent to limit the invention to such use. It will be obvious that other devices than radios might be supplied with power from the improved system shown here, and that many modifications and changes might be made therein without departing from the scope of the invention.

This device may be incorporated into the housing of a radio receiver without producing an unduly large and heavy structure. The plug-in sockets between the various shielded elements eliminate the leads necessary in prior equipment of this type and the automatic shielding which is accomplished upon connection, reduces interference noises in the reproducer to a minimum. The proper circuit connections for each type of input are made by pre-wired connector plugs which cooperate with the connector socket mounted upon the power supply device. Any means such as non-uniform pins or the plugs and corresponding socket apertures may be used to insure identical connection every time the plugs are inserted in the socket.

Referring to Fig. 1 in more detail, the numeral 1 represents a metal casing around the transformer which is mounted on the case 1a, containing associated filter equipment. The connector 2 forms proper connection with the power line or battery. A shielded vibrator element 3 having prongs 4 is adapted to be received in socket 5 attached to casing 1, and likewise a rectifier tube 6 having pins 7 cooperates with socket 8 carried by casing 1. Thus a completely shielded unit is presented which confines all the usual radio frequency interference and prevents it from being present in the reproducer of an associated radio set.

In Fig. 2, the connector 2 has pins 9, 10, 11, 12, 13 and 14 mounted thereon. The cooperating socket member 2a, shown in Fig. 3, has recessed contact members 9a, 10a, 11a, 12a, 13a and 14a which correspond with the respective pins on connector member 2. The socket member 2a may be permanently connected to the commercial 110 volt A. C. power line at contacts 11a and 12a and installed in a radio cabinet. Contacts 9a, 10a and 13a are connected together and when connection is established with connector 2 on the power supply device, an automatic selection of the proper circuits is accomplished as will later be explained in full detail. Fig. 4 shows a socket member 2b which is identical in structure with 2a of Fig. 3, but which may be mounted in an automobile or like vehicle. Contact 14b is connected to the ungrounded terminal of the storage battery in the vehicle, and contact 13b is connected to ground. Thus socket member 2b in combination with connector 2 when inserted therein, selects the proper circuits in the power supply device of Fig. 2 which are designed to operate upon a battery input.

Referring now to Fig. 2, pin 11 of connector 2 is connected to one side of a primary winding 15 of transformer 16. The other end of the primary 15 is connected through one side of a double switch 17 to pin 12 on connector 2. One side of a bypass condenser 18 leads to pin 12 and the other side is grounded. When connection is made to the A. C. line through socket 2a, the pins 9, 10 and the associated circuits are connected with pin 13, which is grounded. The secondary winding 19 of transformer 16 has its ends connected to anodes 20 and 21 of full wave rectifier tube 6 and its midpoint grounded.

The transformer winding 24 is not used when the power supply device is operated from the 110 volt A. C. lines. The function of this winding will be given in detail later in connection with the description of a six volt battery input. The filament winding 25 has one end grounded and the other end connected to the heater lead 30, which in turn is connected to the heater circuit of the tubes in the associated radio set. Indicated diagrammatically at 32 are the heater connections for the tubes of an associated radio set. The various heater return circuits are grounded at 34, which may be the metal container of the equipment. A dial light 36 is connected between lead 30 and pin 10 of connector 2. The cathode 23 of rectifier 6 is connected to a loudspeaker field winding 38 which comprises part of an output filter circuit indicated at 40. Under 110 volt A. C. operation, therefore, the energy flows from primary 15 of the transformer through secondary 19 of the rectifier anodes and the +B set voltage is taken from the cathode 23 and associated filter circuit 40.

When the device is to be operated from a battery, the socket member 2b of Fig. 4 is connected to connector terminal 2. Through the remaining side of double switch 17 is connected pin 14, heater lead 30, and filter circuit 28, all of which are connected to the ungrounded side of the battery through socket 2b. From filter circuit 28 a lead goes to the midpoint of transformer winding 24 having its ends connected to vibrator interrupter 3. The interrupted D. C. produced by vibrator 3 is impressed across the alternate halves of winding 24 which now acts as a primary of transformer 16. The pulsations of D. C. are transferred inductively to secondary 19 which is connected as formerly stated to the anodes 20 and 21 of the rectifier tube 6. Heater lead 30 connects one side of the tube heater system and the rectifier heater with the ungrounded side of the battery, the other side of the heaters being connected to common ground 34. As before, the rectified output is taken from cathode 23 and led through output filter 40.

Figs. 5 and 6 provide for a mechanical rectifier in addition to the tube rectifier. Fig. 5 represents the circuit arrangement when operating on 110 volt A. C. and Fig. 6 represents the arrangement when using a battery input. The circuit alterations may be accomplished by suitable wiring of connector plugs as illustrated in Figs. 3 and 4, or switching means may be employed. Referring to Fig. 5 in more detail, when an A. C. input is employed, winding 37 acts as a primary for the transformer 38. The centertapped winding 39 is connected with the vibrator 50 and is not operative under A. C. input. The secondary winding 41 has one end connected to the plate 42 of a vacuum tube rectifier 43, and the other end grounded. A tapped secondary winding 44 acts as a filament winding, having one end connected to the heater 45 of rectifier tube 43 and the other end connected to ground. The heater 45 receives the full A. C. voltage developed across the winding 44, and the tube heaters receive a lesser voltage taken from tap 46 of the winding. Since the vibrator 50 is inoperative under A. C., no current flows through vibrator leads 47 and 48. The rectified current is taken from the rectifier cathode 49 and may be subsequently filtered by any suitable means.

Fig. 6 is a diagram of the device when battery current is employed. The rectification is accomplished by the mechanical rectifier 50, and the tube 43 is not used. Battery current is supplied to the intermediate tap 46 of the winding 44 and flows to the vibrator 50 through leads 47 and 48 alternately. The current flow thus reverses periodically through the portions of winding 44 which now acts at a primary winding. An alternating current is developed across the center tapped winding 39 and it is rectified by the mechanical rectifier associated with vibrator 50. The direct current output is taken from the center tap of winding 39 and may be led to a suitable filter. The rectifier tube 43, and the windings 37 and 41 are not employed during D. C. operation of the device and do not contribute to the output.

It will be apparent that many changes and modifications in the invention here disclosed may be made by any one skilled in the art without departing from the true spirit and scope of the invention as defined in the following claims.

Having described the invention, what is claimed is:

1. In a power supply system adapted to utilize either an alternating current or direct current source, a transformer having a plurality of windings, an alternating current input circuit connected to one of said windings, a direct current input circuit connected to another of said windings, a circuit interrupter connected to said last named winding, a mechanical rectifier, a secondary winding connected with said rectifier, a thermionic rectifier, a secondary winding connected to said thermionic rectifier, and means for energizing either of said rectifiers from said transformer.

2. In a power supply system adapted to utilize either an alternating current or direct current source, a transformer having a plurality of windings, an alternating current input circuit connected to one of said windings, a direct current input circuit connected to another of said windings, a circuit interrupter connected to said last named winding, a mechanical rectifier, a secondary winding connected with said rectifier, a thermionic rectifier, a secondary winding connected to said thermionic rectifier, means for operating one of said rectifiers when said system is supplied from an alternating current source, and means for operating the other of said rectifiers when said system is operated from a direct source.

3. In a power supply system adapted to utilize either an alternating current or direct current source, a transformer having a plurality of windings, an alternating current input circuit connected to one of said windings, a direct current input circuit connected to another of said windings, a circuit interrupter connected to said last named winding, a mechanical rectifier, a secondary winding connected with said rectifier, a thermionic rectifier, a secondary winding connected to said thermionic rectifier, means for operating said thermionic rectifier when said system is supplied from an alternating current source, and means for operating said mechanical rectifier when said system is supplied from a direct current source.

4. In a power supply system adapted to utilize either an alternating current or a direct current source, a transformer having a plurality of windings, means for imposing a pulsating direct current upon one of said windings, a rectifier connected with another of said windings, a second rectifier connected with a third winding of said transformer, and connecting means comprising an output circuit for said rectifiers.

5. In a power supply system adapted to utilize either an alternating current or a direct current source, a transformer having a plurality of windings, means for imposing a pulsating direct current upon one of said windings, a mechanical rectifier connected with another of said windings, a thermionic rectifier connected with a third winding, and connecting means comprising an output circuit for said rectifiers.

NICHOLAS RASKHODOFF.